United States Patent
Danielsson et al.

(10) Patent No.: US 12,475,576 B2
(45) Date of Patent: Nov. 18, 2025

(54) DEVICE AND METHOD FOR DETERMINING WHETHER THERE IS A MOVEABLE OBJECT LOCATED IN A SCENE AT LEAST A PREDETERMINED PORTION OF A GIVEN PERIOD OF TIME

(71) Applicant: Axis AB, Lund (SE)

(72) Inventors: Niclas Danielsson, Lund (SE); Axel Keskikangas, Lund (SE); Håkan Ardö, Lund (SE)

(73) Assignee: Axis AB, Lund (SE)

( * ) Notice: Subject to any disclaimer, the term of this patent is extended or adjusted under 35 U.S.C. 154(b) by 345 days.

(21) Appl. No.: 18/307,503

(22) Filed: Apr. 26, 2023

(65) Prior Publication Data

US 2023/0360235 A1    Nov. 9, 2023

(30) Foreign Application Priority Data

May 5, 2022   (EP) .................................... 22171780

(51) Int. Cl.
G06T 7/246    (2017.01)
G08B 13/196   (2006.01)

(52) U.S. Cl.
CPC ........ G06T 7/248 (2017.01); G08B 13/19602 (2013.01); *G06T 2207/10016* (2013.01);
(Continued)

(58) Field of Classification Search
None
See application file for complete search history.

(56) References Cited

U.S. PATENT DOCUMENTS

2013/0243252 A1    9/2013  Xu et al.
2019/0087687 A1*   3/2019  Danielsson ............. G06F 16/56
(Continued)

FOREIGN PATENT DOCUMENTS

CN    111639551 A    9/2020
CN    113221787 A    8/2021
(Continued)

OTHER PUBLICATIONS

Extended European Search Report dated Nov. 14, 2022 for European Patent Application No. 22171780.4.
(Continued)

*Primary Examiner* — Vikkram Bali
(74) *Attorney, Agent, or Firm* — Volpe Koenig

(57) ABSTRACT

A plurality of feature vectors for moveable objects are received in a sequence of image frames captured during a first period. The feature vectors are received from a machine learning module trained to extract similar feature vectors in different image frames. An initial value is assigned to a first feature vector, or to a cluster of feature vectors identified in a second sequence of image frames preceding the first image frame. The indicator indicates whether vector is alive. For each subsequent image frame, the indicator is updated by: updating the value based on a similarity between the feature vector and the first feature vector or the cluster of feature vectors. If the value of the indicator indicates that the vector is alive, determining that there is a moveable object that is located in the captured scene at least the predetermined portion of the given period of time.

12 Claims, 4 Drawing Sheets

(52) U.S. Cl.
CPC ............... *G06T 2207/20076* (2013.01); *G06T 2207/20081* (2013.01); *G06T 2207/20084* (2013.01); *G06T 2207/30232* (2013.01)

(56) References Cited

U.S. PATENT DOCUMENTS

2019/0164300 A1* 5/2019 Ardö .................... G06V 10/764
2021/0201009 A1 7/2021 Wu et al.

FOREIGN PATENT DOCUMENTS

| CN | 113221791 A | 8/2021 |
| CN | 113379795 A | 9/2021 |
| WO | 2012074366 A2 | 6/2012 |
| WO | 2021/225472 A2 | 11/2021 |
| WO | 2021225472 A3 | 12/2021 |

OTHER PUBLICATIONS

Ming et al., "Deep learning-based person re-identification methods: A survey and outlook of recent works," (2021).
Ester et al. "A Density-Based Algorithm for Discovering Clusters in Large Spatial Databases with Noise." Knowledge Discovery and Data Mining (1996).
Zheng et al. "Person Re-identification: Past, Present and Future." ArXiv abs/1610.02984 (2016).
Fan et al., "Unsupervised Person Re-identification: Clustering and Fine-tuning," ACM Transactions on Multimedia Computing, Communications, and Applicationsvol. 14 Issue 4, Article No. 83, pp. 1-18 (2018).
Bird et al., "Detection of loitering individuals in public transportation areas," in IEEE Transactions on Intelligent Transportation Systems, vol. 6, No. 2, pp. 167-177, (Jun. 2005).

* cited by examiner

DEVICE AND METHOD FOR DETERMINING WHETHER THERE IS A MOVEABLE OBJECT LOCATED IN A SCENE AT LEAST A PREDETERMINED PORTION OF A GIVEN PERIOD OF TIME

FIELD OF INVENTION

The present disclosure relates to analysing location of moveable objects in a captured scene over time, and specifically to determining whether there is a moveable object that is located in a captured scene at least a predetermined portion of a given period of time.

TECHNICAL BACKGROUND

Identifying when a moveable object, such as a person, vehicle, bag etc, is located in a scene captured by a camera over a given period of time is a task of automated image analysis. This task is sometimes referred to as loitering detection and may be used to detect when the moveable object is located somewhere in the captured scene longer than expected from a typical behaviour in the captured scene in order to trigger an alarm, further analysis of the image data of the captured scene, and/or further actions. For example, a bag being located in a captured scene at an airport for a period of time, a person being located in a captured scene including an automated teller machine (ATM) for a period of time etc may constitute a situation requiring further analysis and/or further actions. Different approaches have been used to attend to the task. For example, one approach uses tracking of movable objects in a scene and measuring the time the object is tracked in the scene and to determine if the tracked object is located in the scene longer than a given period of time during a given time period. However, in such an approach, the tracking of the moveable object may be temporarily interrupted. For example, the moveable object may be temporarily obscured, or the moveable object may temporarily leave (or be removed from) the scene and then return to (or be reintroduced in) the scene. Once the moveable object is identified and tracked again after the interruption there may not exist any association between the tracking of the moveable object before the interruption and the tracking of the moveable object after the interruption. To overcome this problem re-identification algorithms may be used to identify whether an object has been identified previously in the scene. However, such re-identification introduces other problems. For example, in scenarios where many moveable objects enter (are introduced in) and leave (are removed from) the scene there is over time a high risk that a moveable object is erroneously re-identified.

SUMMARY

An object of the present disclosure is to facilitate enhanced determining of whether there is a moveable object that is located in a captured scene at least a predetermined portion of a given period of time.

According to a first aspect, a method for determining whether there is a moveable object that is located in a captured scene at least a predetermined portion of a given period of time is provided. The method comprises receiving a plurality of feature vectors for moveable objects in a first sequence of image frames captured during the given period of time, wherein the feature vectors are received from a machine learning module trained to extract similar feature vectors for the same moveable object in different image frames. The method further comprises assigning an indicator having an initial value to a first feature vector extracted for a moveable object in a first image frame of the first sequence of image frames, or to a cluster of feature vectors identified among feature vectors extracted for moveable objects in a second sequence image frames captured before the given period of time preceding the first image frame. Whether or not the first vector or the cluster of feature vectors, respectively, is alive is determinable based on a value of the indicator. The method further comprises, for each image frame subsequent to the first image frame in the first sequence of image frames and captured within the given period of time from the first image frame, iteratively updating the indicator by: for each feature vector of the plurality of feature vectors for moveable objects in the image frame: updating the value of the indicator based on a similarity between the feature vector and the first feature vector, or on a similarity between the feature vector and the cluster of feature vectors, respectively. The method further comprises, on condition that the value of the indicator indicates that the first feature vector or the cluster of feature vectors, respectively, is alive upon completing the iterative updating, determining that there is a moveable object that is located in the captured scene at least the predetermined portion of the given period of time.

The present disclosure makes use of a recognition that the similarity between a feature vector and the first feature vector or the similarity between a feature vector and the cluster of feature vectors will be a measure of the likelihood that the feature vector is associated to the same moveable object as the first feature vector or that the feature vector and the feature vectors of the cluster of feature vectors are associated to the same moveable object, respectively. This is due to the feature vector being received from a machine learning module trained to extract similar feature vectors for the same moveable object in different image frames. Since the similarity is determined and the value of the indicator is updated for each frame during the given period of time, each update will contribute only to a portion of the total iterative update of the value of the indicator. The cases where a feature vector is similar to the first feature vector or the cluster of feature vectors even if it is not associated to the same moveable object can be made relatively uncommon. Hence these cases will only contribute to a small extent to the total iterative update of the value of the indicator.

The method of the first aspect is more robust than for example methods based on tracking or re-identification since the method of the first aspect is less affected by single instances where a feature vector is similar to the first feature vector or to the cluster of feature vectors even if it is not associated to the same moveable object. These instances will only contribute to a portion of the total iterative update of the value of the indicator. Furthermore, these instances can be made relatively uncommon by the training of the machine learning module.

By a "moveable object" is meant an object that can move or can be moved, such as a person, a vehicle, a bag, or a box.

By "a moveable object that is located in a captured scene at least a predetermined portion of a given period of time" is meant that the moveable object can leave (be removed from) the captured scene and re-enter (be reintroduced into) the captured scene one or more times but over the given period of time it is located in the captured scene at least the predetermined portion of the given period of time. The predetermined portion may be any portion larger than zero and less than or equal to the given period of time. Furthermore, the moveable object need not be located in the same place in the scene but may move around in the scene.

By "the value of the indicator indicates that the first feature vector or the cluster of feature vectors, respectively, is alive" in relation to a particular point in time is meant that the value of the indicator is such that if the method would have been ended at that particular point in time it would be concluded that there is a moveable object that is located in the captured scene at least the predetermined portion of the given period of time. For example, the condition for being considered to be alive could be based on the indicator being larger than a threshold value.

It is to be noted that, since determining that the moveable object is located in a captured scene at least a predetermined portion of a given period of time is based on the similarity of feature vectors in the image frames and the first feature vector or the cluster of feature vectors, and this similarity is based on the machine learning module, the determining can only be made to a certain confidence.

The method according to the first aspect may further comprise triggering an alarm upon determining that there is a moveable object that is located in the captured scene at least the predetermined portion of the given period of time.

In an embodiment, the indicator is assigned to the first feature vector, the initial value is greater than a first threshold value, and a value of the indicator greater than the first threshold value indicates that the first feature vector is alive whereas a value of the indicator equal to or less than the first threshold value indicates that the first feature vector is not alive. Furthermore, the indicator is iteratively updated by: i) reducing the value of the indicator by a first amount; and ii) for each feature vector of the plurality of feature vectors for moveable objects in the image frame: determining a second amount based on a similarity between the feature vector and the first feature vector, and increasing the value of the indicator by the second amount. The iterative updating is performed for each image frame subsequent to the first image frame in the first sequence of image frames and captured within the given period of time from the first image frame.

The feature vectors may be received from a machine learning module trained to minimize distances between feature vectors extracted for the same moveable object in different image frames, and wherein the second amount is determined based on a distance between the further feature vector and the first feature vector. The second amount may then be determined to be larger the smaller the distance is between the feature vector and the first feature vector.

In alternative, the second amount may be determined to be a fixed non-zero amount if the distance between the feature vector and the first feature vector is smaller than a threshold distance, and determined to be zero if the distance between the feature vector and the first feature vector is equal to or larger than the threshold distance.

In an embodiment, the indicator is assigned to the cluster of feature vectors and the initial value is greater than a second threshold value, wherein a value of the indicator indicating that the number of feature vectors determined to belong to the cluster of feature vectors per time unit is greater than the second threshold value indicates that the cluster of feature vectors is alive, and a value of the indicator indicating that the number of feature vectors determined to belong to the cluster of feature vectors per time unit is equal to or less than the second threshold value indicates that the first feature vector is not alive. Furthermore, the indicator is iteratively updated by: i) reducing the value of the indicator by a third amount, and ii) for each feature vector of the plurality of feature vectors for moveable objects in the image frame: determining whether the feature vector belongs to the cluster of feature vectors based on the similarity between the feature vector and the cluster of feature vectors, and if the feature vector belongs to the cluster of feature vectors, increasing the value of the indicator by a fourth amount. The iterative updating is performed for each image frame subsequent to the first image frame in the first sequence of image frames and captured within the given period of time from the first image frame.

The feature vectors may be received from a machine learning module trained to extract feature vectors maximizing the probability for the same moveable object in different image frames to be located in a same cluster according to a cluster algorithm, and wherein the feature vector is determined to belong to the cluster of feature vectors according to the cluster algorithm.

The feature vectors may be received from a machine learning module trained to extract feature vectors for the same moveable object in different image frames having shorter mutual distances than distances to feature vectors extracted for other moveable objects, and wherein the value of the indicator is updated based on a distance between the feature vector and the first feature vector, or on a distance between the feature vector and the cluster of feature vectors, respectively.

The machine learning module may comprise a neural network.

According to a second aspect, a non-transitory computer-readable storage medium is provided having stored thereon instructions for implementing the method according to the first aspect or the method according to the first aspect, when executed by a device having a processing and a receiver.

According to a third aspect, a device for determining whether there is a moveable object that is located in a captured scene at least a predetermined portion of a given period of time is provided. The device comprises circuitry configured to execute a receiving function, an assigning function, an updating function and a determining function. The receiving function is configured to receive a plurality of feature vectors for moveable objects in a first sequence of image frames captured during the given period of time, wherein the feature vectors are received from a machine learning module trained to extract similar feature vectors for the same moveable object in different image frames. The assigning function is configured to assign an indicator having an initial value to a first feature vector extracted for a moveable object in a first image frame of the first sequence of image frames, or to a cluster of feature vectors identified among feature vectors extracted for moveable objects in a second sequence of image frames captured before the given period of time preceding the first image frame. The updating function is configured to, for each image frame subsequent to the first image frame in the first sequence of image frames and captured within the given period of time from the first image frame, iteratively updating the indicator by: for each feature vector of the plurality of feature vectors for moveable objects in the image frame: updating the value of the indicator based on a similarity between the feature vector and the first feature vector, or on a similarity between the feature vector and the cluster of feature vectors, respectively. The determining function is configured to, on condition that the value of the indicator indicates that the first feature vector or the cluster of feature vectors, respectively, is alive upon completing the iterative updating, determine that there is a moveable object that is located in the captured scene at least the predetermined portion of the given period of time.

In the assigning function, the indicator may be assigned to the first feature vector and the initial value is greater than a first threshold value, wherein a value of the indicator greater than the first threshold value indicates that the first feature vector is alive, and a value of the indicator equal to or less than the first threshold value indicates that the first feature vector is not alive. In the updating function, the indicator may then be iteratively updated by: reducing the value of the indicator by a first amount, and for each feature vector of the plurality of feature vectors for moveable objects in the image frame: determining a second amount based on a similarity between the feature vector and the first feature vector, and increasing the value of the indicator by the second amount.

Alternatively, in the assigning function, the indicator may be assigned to the cluster of feature vectors and the initial value is greater than the second threshold value, wherein a value of the indicator indicating that the number of feature vectors determined to belong to the cluster of feature vectors per time unit is greater than the second threshold value indicates that the cluster of feature vectors is alive, and a value of the indicator indicating that the number of feature vectors determined to belong to the cluster of feature vectors per time unit is equal to or less than the second threshold value indicates that the first feature vector is not alive. In the updating function, the indicator may then be iteratively updated by: reducing the value of the indicator by a third amount , and for each feature vector of the plurality of feature vectors for moveable objects in the image frame: determining whether the feature vector belongs to the cluster of feature vectors based on the similarity between the feature vector and the cluster of feature vectors, and if the feature vector belongs to the cluster of feature vectors, increasing the value of the indicator by a fourth amount.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting but are instead used for explaining and understanding.

DETAILED DESCRIPTION

Figure 1:
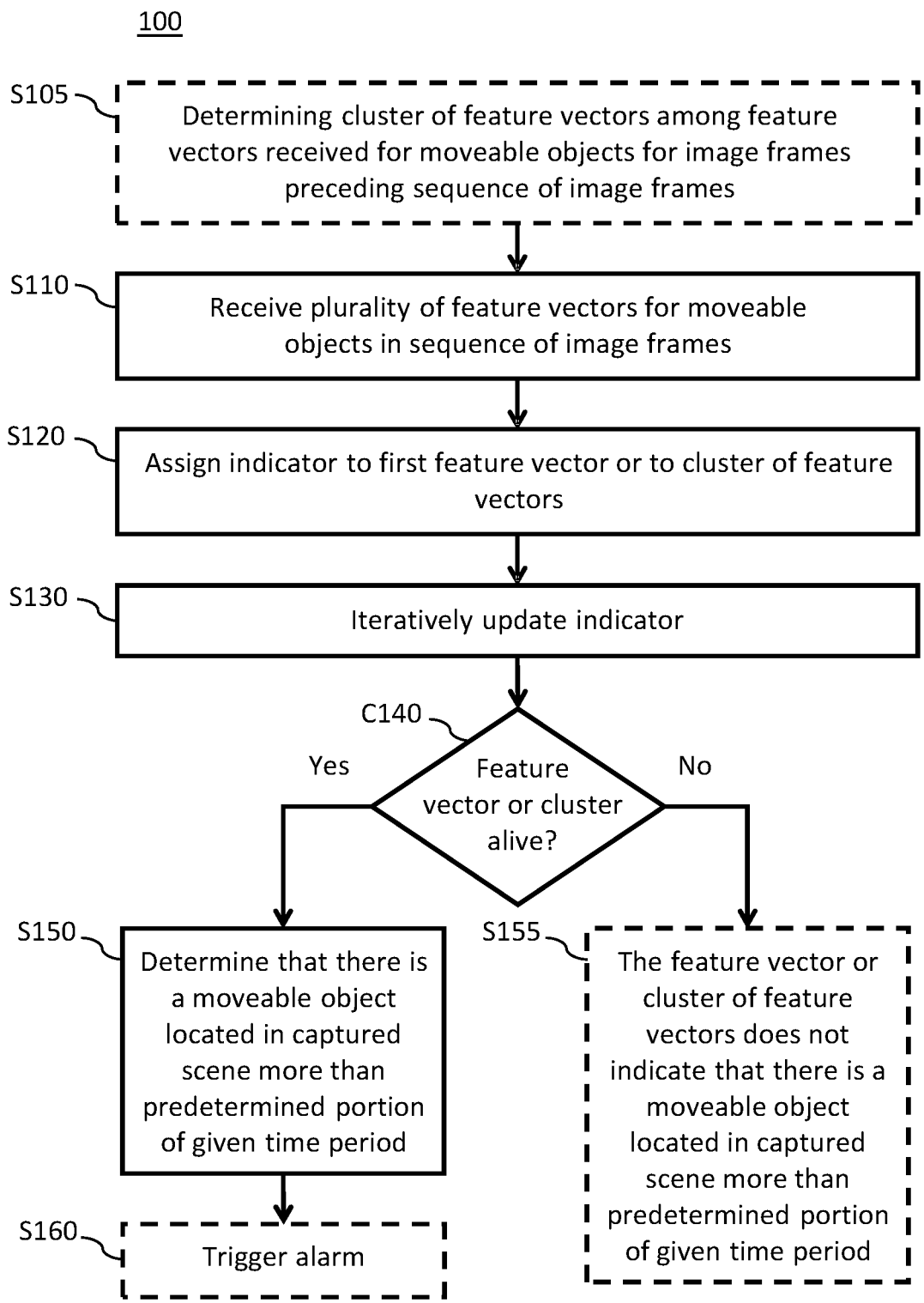
FIG. 1 shows a flow chart in relation to embodiments of a method of the present disclosure.

The present disclosure will now be described hereinafter with reference to the accompanying drawings, in which currently preferred embodiments of the disclosure are illustrated. This disclosure may, however, be embodied in many different forms and should not be construed as limited to the embodiments set forth herein.

The disclosure is applicable in scenarios in which moveable objects enter (are introduced in) and leave (are removed from) a scene captured over time in a sequence of image frames. The sequence of image frames may form part of a video. Such a scenario for example arises when a scene is captured in a sequence of image frames by means of a surveillance camera. The moveable objects have been detected using an object detection module using any kind of object detection. An aim of the disclosure is to determine whether a moveable object, such as a person, vehicle, bag etc., remains in a captured scene or repeatedly moves in and out of the captured scene such that the moveable object is located in the captured scene more than a predetermined portion of a given period of time. This is sometimes referred to loitering detection but is extended to also cover other moveable objects than persons and to also cover the moveable object to temporality move out from the captured scene one or more times over the given period of time. The captured scene may for example be a captured scene in which moveable objects are expected to pass through only once and/or remain in only for an expected period of time before moving out of the captured scene and not returning for a substantial period of time. Such scenes may be a scene at an airport, a scene including an ATM.

In the following, embodiments of a method 100 for determining whether there is a moveable object that is located in a captured scene at least a predetermined portion of a given period of time will be discussed with reference to FIG. 1.

The predetermined portion may be any portion larger than zero and less than or equal to the given period of time. The predetermined portion and the given period of time may be set based on typical movement patterns of moveable objects in the captured scenes. For example, the predetermined portion and the given period of time may be set such that a moveable object being located in the captured scene at least the predetermined portion of the given period of time constitutes a deviation from an expected movement pattern and/or constitutes a movement pattern that should be further analysed. For example, this may constitute a movement pattern that is unwanted or suspicious from a surveillance point of view.

Setting the predetermined portion larger than zero and less than the given period of time is suitable for identifying when a moveable object remains at least the predetermined portion of the given time period before leaving (being removed from) the captured scene not to return (be reintroduced in) the captured scene during the rest of the given period of time. Setting the predetermined portion larger than zero and less than the given period of time is also suitable for identifying when a moveable object enters (is introduced in) and leaves (is removed from) the captured scene two or more time such that the movable object is located at least the predetermined portion of the given time period in total.

Setting the predetermined portion equal to the given period of time is suitable only for identifying when a moveable object remains in the captured scene all of the given time period.

The method 100 comprises receiving S110 a plurality of feature vectors for moveable objects in a first sequence of image frames captured during the given period of time. The feature vectors are received from a machine learning module trained to extract similar feature vectors for the same moveable object in different image frames.

The first sequence of image frames may be all image frames captured during the given period of time but may also be a subset of all image frames captured during the given period of time. If the first sequence of image frames is a subset of all image frames captured during the given period of time, it may for example be every second image frame, every third image frame etc. If it is a subset of all of the image frames, it should preferably consist of image frames evenly distributed over the given period of time.

The properties of the feature vectors will depend on the type of machine learning module from which they are received. For example, the machine learning module may comprise a support vector machine (SVM), a neural network, or other type of machine learning. For example, see "Deep learning-based person re-identification methods: A survey and outlook of recent works" by Z. Ming et al, College of Computer Science, Sichuan University, Chendu 610065, Chine, 2022 (https://arxiv.org/abs/2110.04764). In alternative to feature vectors from a machine learning module, it would also be possible to use hand-crafted features, such as colour histograms or the like. However, the latter will likely result in less accurate determination.

In some embodiments only one feature vector is extracted for each moveable object in each image frame of the first sequence of image frames. In alternative more than one feature vector may be extracted for each moveable object in each image frame of the first sequence of image frames. For example, if more than one feature vector is extracted, these may relate to different portions of the moveable object. In this alternative, the method may be performed for one or more of the feature vectors. For example, if a separate feature vector is extracted for a face of a person and one or more other feature vectors are extracted for other portions of the person in the image frames, the method may be performed for only the feature vector relating to the face or for some or all of the one or more other feature vectors.

The method 100 further comprises assigning S120 an indicator having an initial value to a first feature vector extracted for a moveable object in a first image frame of the first sequence of image frames, or assigning S120 the indicator to a cluster of feature vectors extracted for moveable objects in a second sequence of image frames captured before the given period of time, i.e., preceding the first image frame.

When the indicator is assigned to the cluster of feature vectors, the method is preceded by or implicitly includes receiving the feature vectors extracted for moveable objects in the second sequence of image frames and identifying the cluster of feature vectors among the feature vectors extracted for moveable objects in the second sequence of image frames.

The second sequence of image frames may be any sequence of image frames captured before the first sequence of image frames but is preferably a sequence that ends immediately before the start of the first sequence of image frames.

The second sequence of image frames may be all image frames captured during a further given period of time before the start of the first sequence of image frames but may also be a subset of all image frames captured during the further given period of time. If the second sequence of image frames is a subset of all image frames captured during the further given period of time, it may for example be every second image frame, every third image frame etc. If it is a subset of all of the image frames, it should preferably consist of image frames evenly distributed over the further given period of time.

The cluster of feature vector may be identified among the feature vectors extracted for moveable objects in the second sequence of image frames using any suitable cluster algorithm, such as k-means, expectation-maximization (EM), agglomerative clustering, etc. The cluster of feature vectors may be defined such that the feature vectors of the cluster of feature vectors are likely extracted for the same moveable object. This may for example be based on the similarity of the feature vectors of the cluster of feature vectors.

The method 100 further comprises, for each image frame subsequent to the first image frame in the first sequence of image frames and captured within the given period of time from the first image frame, iteratively updating S130 the indicator. In each iteration an update is performed for each feature vector of the plurality of feature vectors for moveable objects in the image frame. The update comprises updating the value of the indicator based on a similarity between the feature vector and the first feature vector, or on a similarity between the feature vector and the cluster of feature vectors, respectively.

By the value of the indicator being updated based on a similarity between the feature vector and the first feature vector, or on a similarity between the feature vector and the cluster of feature vectors, is meant that a higher similarity will result in a larger contribution to the total updating of the value in the iterative updating.

Only a similarity between each feature vector in each image frame and the first feature vector is used or similarity between each feature vector in each image frame and the cluster of feature vectors is required for the updating of the value of the indicator. There is no need to provide any further analysis whether the different feature vectors are extracted for the same moveable object in different image frames, or whether all feature vectors of the cluster of feature vectors are extracted for the same moveable object in different image frames. Hence, a feature vector in an image frame which is extracted for a different movable object than the first feature vector may provide some contribution to the update of the value of the indicator. However, as the machine learning module trained to extract similar feature vectors for the same moveable object in different image frames, feature vectors extracted for the same moveable object as the first feature vector will have a higher contribution than feature vectors extracted for a different moveable object than the first feature vector.

The same measure of similarity between the feature vector and the cluster of feature vectors may be used for the updating as was used when identifying the cluster of feature vectors among the feature vectors extracted for moveable objects in the second sequence of image frames captured before the given period of time preceding the first image frame.

If a feature vector extracted for a moveable object by means of the machine learning module includes a large number of dimensions (e.g., 256), such as for example if the machine learning module includes a neural network, the number of dimensions may be reduced before determining the similarity between the feature vector and the first feature vector, or determining the similarity between the feature vector and the cluster of feature vectors. For example, the dimensions of a feature vector may be reduced by projection of the feature vector onto principal component analysis (PCA) space. The reduction of dimensions may be performed after the feature vector has been received from the machine learning module or it may be performed before it is received. In the former case, the method includes a further act of reducing dimensions of each feature vector of the plurality of feature vectors. In the latter case, the number of dimensions of each feature vector of the plurality of feature vectors has already been reduced when received from the machine learning module.

The method 100 further comprises, on condition C140 that the value of the indicator indicates that the first feature vector or the cluster of feature vectors, respectively, is alive upon completing the iterative updating, determining S150 that there is a moveable object that is located in the captured scene at least the predetermined portion of the given period of time.

By "the value of the indicator indicates that the first feature vector or the cluster of feature vectors, respectively, is alive" in relation to a particular point in time is meant that the value of the indicator is such that if the method would have been ended at that particular point in time it would be concluded that there is a moveable object that is located in the captured scene at least the predetermined portion of the given period of time.

Determining S150 that there is a moveable object that is located in the captured scene at least the predetermined portion of during the given period of time may further be conditioned C140 on that the value of the indicator indicates that the first vector or the cluster of feature vectors, respectively, is alive throughout the iterative updating of the indicator.

The method 100 may further comprise triggering S160 an alarm upon determining that there is a moveable object that is located in the captured scene at least the predetermined portion of the given period of time.

If the value of the indicator indicates that the first feature vector or the cluster of feature vectors, respectively, is not alive upon completing the iterative updating, this means that it cannot be said that there is a moveable object located in the captured scene at least the predetermined portion of the given period of time based on the indicator assigned to the first feature vector or the cluster of feature vectors. This situation will normally not lead to any specific further action being performed in the method. Specifically, as there is typically several other feature vectors corresponding to the first feature vector or several other clusters of feature vectors corresponding to the cluster of feature vectors being monitored during the given period of time and for which respective indicators are assigned and iteratively updated, it cannot be said that there is no moveable object located in the captured scene at least the predetermined portion of the given period of time since one of these several other feature vectors or several other clusters of feature vectors may relate to an other moveable object which is located in the captured scene at least the predetermined portion of the given period of time.

The method 100 may be performed either for the first feature vector or for the cluster of feature vectors. However, the method 100 may also be performed for the first feature vector or in relation to the cluster of feature vectors in parallel.

The feature vectors may be received S110 from a machine learning module trained to extract feature vectors for the same moveable object in different image frames having shorter mutual distances than distances to feature vectors extracted for other moveable objects. The value of the indicator may then be updated based on a distance between the feature vector and the first feature vector, or on a distance between the feature vector and the cluster of feature vectors, respectively.

The method 100 is described for the first feature vector extracted for a moveable object in the first image frame of the first sequence of image frames or for the cluster of feature vectors identified among feature vectors extracted for moveable objects in the second sequence of image frames. The method 100 may then be performed for each vector extracted for moveable objects in the first image frame of the first sequence of image frames or for each cluster of feature vectors identified among the feature vectors extracted for moveable objects in the second sequence of image frames. Furthermore, the method 100 may be performed for each vector extracted for moveable objects in each image frame subsequent to the first image frame. Clusters of feature vectors may be identified among feature vectors extracted for moveable objects at regular intervals, e.g., an interval corresponding to the second sequence of image frames.

In the following, sub-steps of the act of iteratively updating the indicator in relation to embodiments of a method of the present disclosure will be discussed with reference to FIG. 1 and FIG. 2.

For embodiments in which the indicator is assigned S120 to the first feature vector, the initial value of the indicator may be set to a value greater than a first threshold value. A value of the indicator greater than the first threshold value indicates that the first feature vector is alive whereas a value of the indicator equal to or less than the first threshold value indicates that the first feature vector is not alive.

Figure 2:
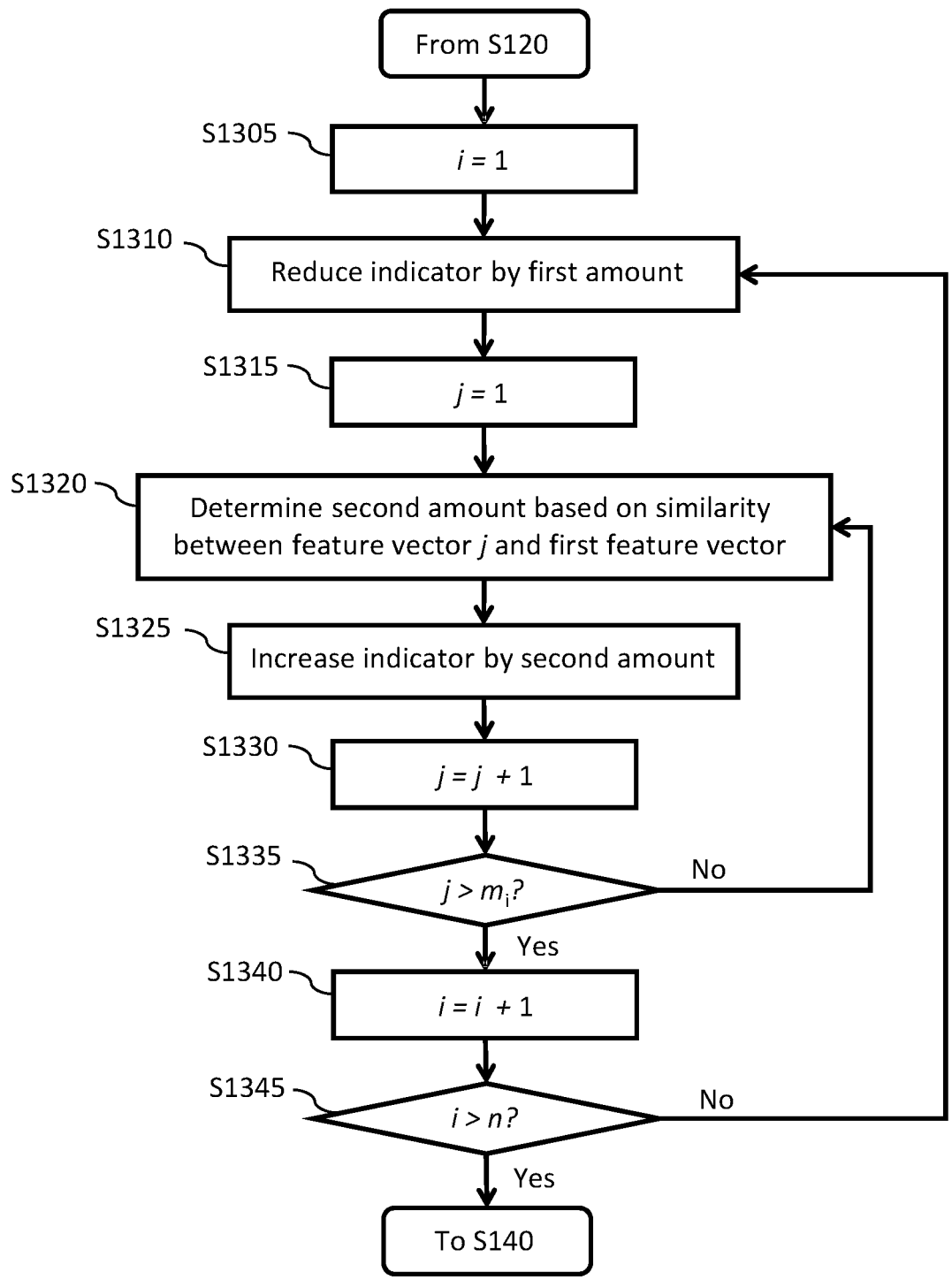
FIG. 2 shows a flow chart including sub-steps of the act of iteratively updating the indicator in relation to embodiments of a method of the present disclosure.

In relation to FIG. 2, the number of frames subsequent to the first image frame in the first sequence of image frames and captured within the given period of time from the first image frame is n and hence the iterative update S130 of the indicator is performed for each image frame $i=1 \rightarrow n$. Furthermore, the number of extracted feature vectors for each frame j is mi. hence, for each image frame i, the updating is performed for each extracted feature vector $j=1 \rightarrow mi$ of that image frame i.

Starting with the first image frame $i=1$ S1305 subsequent to the first image frame in the first sequence of image frames, the value of the indicator is reduced S1310 by a first amount. The first amount is typically the same for all iterations for all of the image frames $i=1 \rightarrow n$. Hence, for the iterations over all image frames $i=1 \rightarrow n$, the value of the indicator will be reduced by n first amount. Starting with a first extracted feature vector $j=1$ S1315 for the first image frame $i=1$ a second amount is determined S1320 based on a similarity between the feature vector $j=1$ and the first feature vector. The value of the indicator is then increased S1325 by the second amount. The feature vector index j is incremented $j=j+1$ S1330 and as long as the vector index j is not larger than the number of feature vectors mi for the image frame $i=1$ $j>mi$ S1335, the acts of determining S1320 a second amount, increasing S1325, and incrementing the feature vector index j S1330 are repeated. The image frame index i is then incremented i=i+1 S1340. The iterative updating is then performed for the remaining image frames i=2→n in an analogous way as for the for the first image frame i=1.

Determining S150 that there is a moveable object that is located in the captured scene at least the predetermined portion of the given period of time is conditioned on the value of the indicator being greater than the first threshold value, i.e., that the first feature vector is alive, upon completing the iterative updating.

The first amount, the second amount, and the first threshold value are preferably set such that, if the moveable object associated with the first feature vector is located in the captured scene at least the predetermined portion of the given period of time, the value of the indicator after the iterative updating of FIG. 2 should be greater than the first threshold value, and such that, if the moveable object associated with the first feature vector is not located in the captured scene at least the predetermined portion of the given period of time, the value of the indicator after the iterative updating of FIG. 2 should be less than or equal to the first threshold value. The values may be set by means of an iterative process with evaluation of the methods ability of correct determining whether the moveable object associated with the first feature vector is located in the captured scene at least the predetermined portion of the given period of time. The values will depend on the type of moveable objects, and the type of machine learning module used for extracting feature vectors for the moveable objects. The values will also depend on the number of image frames in the first sequence of image frames, which in turn depends on the length of the given time period. The values will also depend on the predetermined portion.

The feature vectors may be received S110 from a machine learning module trained to minimize distances between feature vectors extracted for the same moveable object in different image frames. The second amount may then be determined S1320 based on a distance between the feature vector and the first feature vector. The second amount may then be determined S1320 to be larger the smaller the distance is between the feature vector and the first feature vector.

In alternative, the second amount may be determined S1320 to be a fixed non-zero amount if the distance between the feature vector and the first feature vector is smaller than a threshold distance, and determined S1320 to be zero if the distance between the feature vector and the first feature vector is equal to or larger than the threshold distance. By this, any feature vector which has a longer distance to the first feature vector than the threshold distance will have no contribution to the updating of the value of the indicator.

The method 100 is described for the first feature vector extracted for a moveable object in the first image frame of the first sequence of image frames. The method 100 may then be performed for each vector extracted for moveable objects in the first image frame of the first sequence of image frames. Furthermore, the method 100 may be performed for each vector extracted for moveable objects in each image frame subsequent to the first image frame. Hence, the method may be performed for each extracted feature vector in each image frame and thus each extracted feature vector will have an indicator assigned to it. Once the given period of time has expired in relation to an extracted feature vector, it is determined whether its assigned indicator indicates that the feature vector is alive. If this is the case, it is determined that there is a moveable object that is located in the captured scene at least the predetermined portion of the given period of time. If not, that feature vector does not indicate that there is a moveable object located in the captured scene more than the predetermined portion of the given period of time. After the given period of time in relation to the feature vector, the method is ended and no further comparison to extracted feature vectors in subsequent image frames is performed in relation to that feature vector and the indicator assigned to that feature vector can be discarded. By performing the method for each extracted feature vector in each image frame a robustness is achieved. If an indicator assigned to a first feature vector extracted in a first image frame and relating to a moveable object does not indicate that the first feature vector is alive after the given period of time from the first image frame, a second feature vector extracted in a second image frame subsequent to the first image frame and relating to the same moveable object may have an assigned indicator that indicates that the second feature vector is alive after the given period of time from the second image frame.

In the following, sub-steps of the act of iteratively updating the indicator in relation to alternative embodiments of a method of the present disclosure will be discussed with reference to FIG. 1 and FIG. 3.

For embodiments in which the indicator is assigned S120 to the cluster of feature vectors, the initial value of the indicator may be set to a value greater than a second threshold value. A value of the indicator indicating that the number of feature vectors determined to belong to the cluster of feature vectors per time unit is greater than the second threshold value indicates that the cluster of feature vectors is alive, and a value of the indicator indicating that the number of feature vectors determined to belong to the cluster of feature vectors per time unit is equal to or less than the second threshold value indicates that the first feature vector is not alive.

Figure 3:
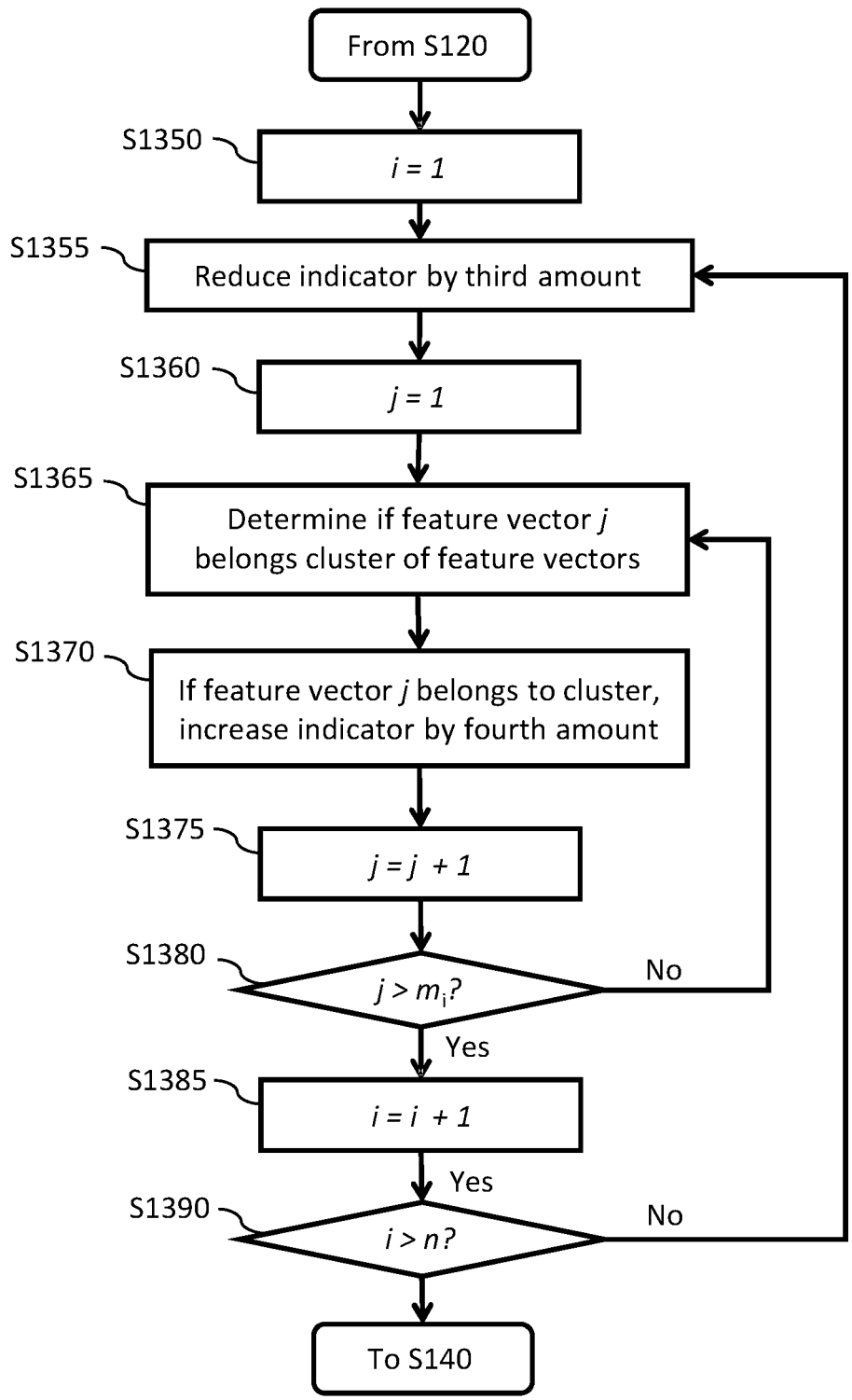
FIG. 3 shows a flow chart including sub-steps of the act of iteratively updating the indicator in relation to alternative embodiments of a method of the present disclosure.

In relation to FIG. 3, the number of frames subsequent to the first image frame in the first sequence of image frames and captured within the given period of time from the first image frame is n and hence the iterative update S130 of the indicator is performed for each image frame i=1→n. Furthermore, the number of extracted feature vectors for each frame j is mi. hence, for each image frame i, the updating is performed for each extracted feature vector j=1→mi of that image frame i.

Starting with the first image frame i=1 S13505 subsequent to the first image frame in the first sequence of image frames, the value of the indicator is reduced S1355 by a third amount. The third amount is typically the same for all iterations for all of the image frames i=1→n. Hence, for the iterations over all image frames i=1→n, the value of the indicator will be reduced by n first amount. Starting with a first extracted feature vector j=1 S1360 for the first image frame i=1, it is determined S1365 if the feature vector belongs to the cluster of feature vectors based on the similarity between the feature vector and the cluster of feature vectors, and if the feature vector belongs to the cluster of feature vectors, the value of the indicator is increased S1370 by a fourth amount. The feature vector index j is incremented j=j+1 S1375 and as long as the vector index j is not larger than the number of feature vectors mi for the image frame i=1 j>mi S1380, the acts of determining S1365 if the feature vector j belongs to the cluster of feature vectors, increasing S1370, and incrementing the feature vector index j S1375 are repeated. The image frame index i is then incremented i=i+1 S1385. The iterative updating is then performed for the remaining image frames i=2→n in an analogous way as for the for the first image frame i=1.

Determining S150 that there is a moveable object that is located in the captured scene at least the predetermined portion of the given period of time is conditioned on the value of the indicator being greater than the second threshold value, i.e., that the cluster of feature vectors is alive, upon completing the iterative updating.

The third amount, the fourth amount, and the second threshold value are preferably set such that, if the moveable object associated with the cluster of feature vectors is located in the captured scene at least the predetermined portion of the given period of time, the value of the indicator after the iterative updating of FIG. 3 should be greater than the second threshold value, and such that, if the moveable object associated with the cluster feature vectors is not located in the captured scene at least the predetermined portion of the given period of time, the value of the indicator after the iterative updating of FIG. 2 should be less than or equal to the second threshold value. The values may be set by means of an iterative process with evaluation of the methods ability of correct determining whether the moveable object associated with the first feature vector is located in the captured scene at least the predetermined portion of the given period of time. The values will depend on the type of moveable objects, and the type of machine learning module used for extracting feature vectors for the moveable objects. The values will also depend on the number of image frames in the first sequence of image frames, which in turn depends on the length of the given time period. The values will also depend on the predetermined portion.

The method 100 is described for the cluster of feature vectors identified among feature vectors extracted for moveable objects in the second sequence of image frames. The method 100 may be performed for each cluster of feature vectors identified among the feature vectors extracted for moveable objects in the second sequence of image frames. Clusters of feature vectors may be identified among feature vectors extracted for moveable objects at regular intervals, e.g., an interval corresponding to the second sequence of image frames. The method 100 may then be performed for each cluster of feature vectors identified among the feature vectors extracted for moveable objects at the regular intervals. The identification of cluster should be such that each cluster of feature vectors is likely to correspond to one moveable object. By identifying clusters of feature vectors regularly the method may be performed for new moveable objects entering the scene. After the given period of time in relation to each cluster, the method is ended and no further comparison to extracted feature vectors in subsequent image frames is performed for that cluster and the indicator assigned to that cluster can be discarded.

The feature vectors may be received S110 from a machine learning module trained to extract feature vectors maximizing the probability for the same moveable object in different image frames to be located in a same cluster according to a cluster algorithm. The feature vector may then be determined S1370 to belong to the cluster of feature vectors according to the cluster algorithm.

For example, Density-based spatial clustering of applications with noise (DBSCAN) may be used as the cluster algorithm as disclosed e.g., in Ester, M. et al. "A density-based algorithm for discovering clusters in large spatial databases with noise". Proceedings of the Second International Conference on Knowledge Discovery and Data Mining (KDD-96). AAAI Press. pp. 226-231. CiteSeerX 10.1.1.121.9220. ISBN 1-57735-004-9.

In alternative, the feature vectors may be received S110 from a machine learning module trained to minimize distances between feature vectors extracted for the same moveable object in different image frames. Instead of having a fixed fourth amount, the fourth amount may then be determined based on a distance between the feature vector and the cluster. The fourth amount may then be determined to be larger the smaller the distance is between the feature vector and the cluster and be added to the indicator without any condition that the feature vector belongs to the cluster.

Figure 4:
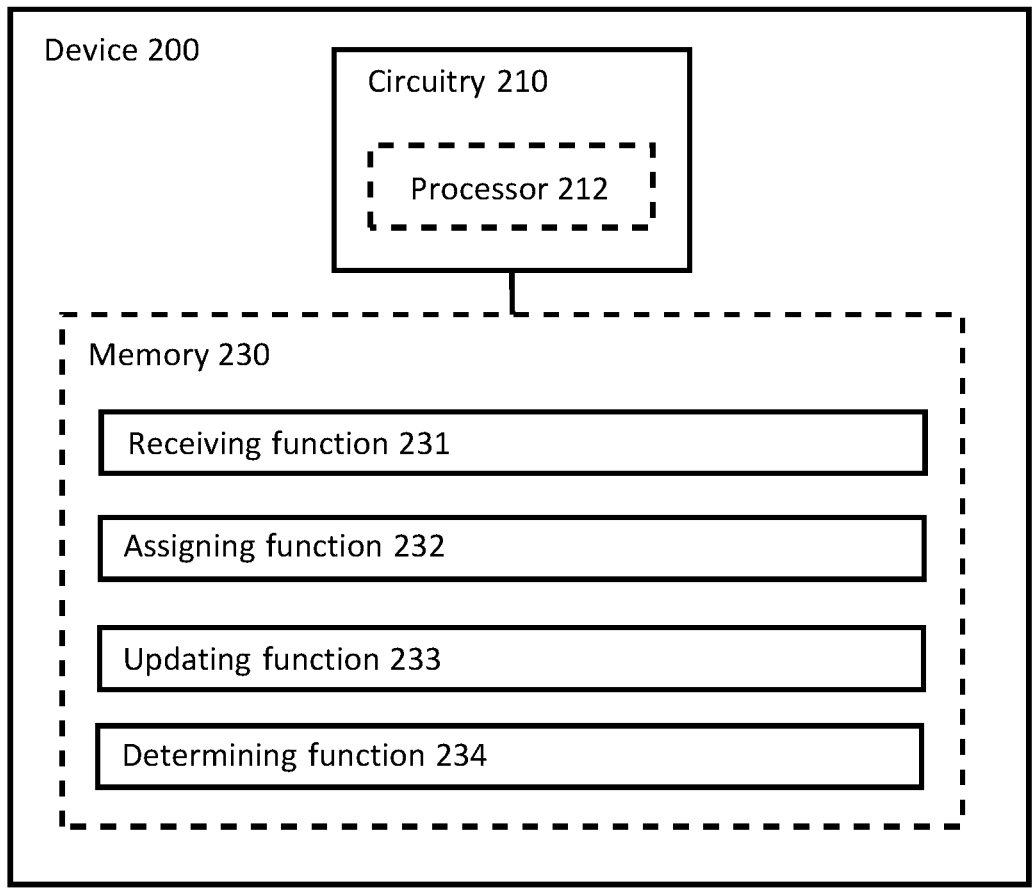
FIG. 4 shows a schematic diagram in relation to embodiments of a device of the present disclosure.

FIG. 4 shows a schematic diagram in relation to embodiments of a device 200 of the present disclosure for determining whether there is a moveable object that is located in a captured scene at least a predetermined portion of a given period of time. The device 200 comprises circuitry 210. The circuitry 210 is configured to carry out functions of the device 200. The circuitry 210 may include a processor 212, such as a central processing unit (CPU), microcontroller, or microprocessor. The processor 212 is configured to execute program code. The program code may for example be configured to carry out the functions of the device 200.

The device 200 may further comprise a memory 230. The memory 230 may be one or more of a buffer, a flash memory, a hard drive, a removable media, a volatile memory, a non-volatile memory, a random access memory (RAM), or another suitable device. In a typical arrangement, the memory 230 may include a non-volatile memory for long term data storage and a volatile memory that functions as device memory for the circuitry 210. The memory 230 may exchange data with the circuitry 210 over a data bus. Accompanying control lines and an address bus between the memory 230 and the circuitry 210 also may be present.

Functions of the device 200 may be embodied in the form of executable logic routines (e.g., lines of code, software programs, etc.) that are stored on a non-transitory computer readable medium (e.g., the memory 230) of the device 200 and are executed by the circuitry 210 (e.g., using the processor 212). Furthermore, the functions of the device 200 may be a stand-alone software application or form a part of a software application that carries out additional tasks related to the device 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to execute a receiving function 231, an assigning function 232, an updating function 233, and a determining function 234.

The receiving function 231 is configured to receive a plurality of feature vectors for moveable objects in a first sequence of image frames captured during the given period of time, wherein the feature vectors are received from a machine learning module trained to extract similar feature vectors for the same moveable object in different image frames.

The assigning function 232 is configured to assign an indicator having an initial value to a first feature vector extracted for a moveable object in a first image frame of the first sequence of image frames, or to a cluster of feature vectors identified among feature vectors extracted for moveable objects in a second sequence of image frames captured before the given period of time preceding the first image frame.

The updating function 233 is configured to, for each image frame subsequent to the first image frame in the first sequence of image frames and captured within the given period of time from the first image frame, iteratively updating the indicator by: for each feature vector of the plurality of feature vectors for moveable objects in the image frame: updating the value of the indicator based on a similarity between the feature vector and the first feature vector, or on a similarity between the feature vector and the cluster of feature vectors, respectively.

The determining function 234 is configured to, on condition that the value of the indicator indicates that the first feature vector or the cluster of feature vectors, respectively, is alive upon completing the iterative updating by the updating function 233, determine that there is a moveable object that is located in the captured scene at least the predetermined portion of the given period of time.

The device 200 may be realised in more than one physical locations, such that one or more of the functions are implemented at one physical location and one or more other functions are implemented in another physical location. In alternative all of the functions of the device 200 may be implemented as a single device at a single physical location. The single device may for example be a surveillance camera.

In the assigning function 232, the indicator may be assigned to the first feature vector and the initial value is greater than a first threshold value, wherein a value of the indicator greater than the first threshold value indicates that the first feature vector is alive, and a value of the indicator equal to or less than the first threshold value indicates that the first feature vector is not alive. In the updating function 233, the indicator may then be iteratively updated by: reducing the value of the indicator by a first amount, and for each feature vector of the plurality of feature vectors for moveable objects in the image frame: determining a second amount based on a similarity between the feature vector and the first feature vector, and increasing the value of the indicator by the second amount. For further details and possible adaptations, reference is made to FIG. 2 and the description with reference thereto.

Alternatively, in the assigning function 232, the indicator may be assigned to the cluster of feature vectors and the initial value is zero, wherein a value of the indicator indicating that the number of feature vectors determined to belong to the cluster of feature vectors per time unit is greater than a second threshold value indicates that the cluster of feature vectors is alive, and a value of the indicator indicating that the number of feature vectors determined to belong to the cluster of feature vectors per time unit is equal to or less than the second threshold value indicates that the first feature vector is not alive. In the updating function 233, the indicator may then be iteratively updated by: for each feature vector of the plurality of feature vectors for moveable objects in the image frame: determining whether the feature vector belongs to the cluster of feature vectors based on the similarity between the feature vector and the cluster of feature vectors, and if the feature vector belongs to the cluster of feature vectors, increasing the value of the indicator by a fourth amount. For further details and possible adaptations, reference is made to FIG. 3 and the description with reference thereto.

The functions carried out by the circuitry 210 may be further adapted as the corresponding steps of the embodiments of the methods described in relation to FIG. 1, FIG. 2 and FIG. 3.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A computer implemented method for determining whether there is a moveable object that is located in a captured scene at least a predetermined portion of a given period of time, the method comprising:
   receiving a plurality of feature vectors for moveable objects in a first sequence of image frames captured during the given period of time, wherein the plurality of feature vectors is received from a machine learning module trained to extract similar feature vectors for the same moveable object in different image frames;
   assigning an indicator having an initial value to a first feature vector extracted for a moveable object in a first image frame of the first sequence of image frames,
   wherein the initial value is greater than a first threshold value,
   wherein a value of the indicator greater than the first threshold value indicates that the first feature vector is alive, and
   wherein a value of the indicator equal to or less than the first threshold value indicates that the first feature vector is not alive;
   for each image frame subsequent to the first image frame in the first sequence of image frames and captured within the given period of time from the first image frame, performing an iterative updating of the indicator by:
      reducing the value of the indicator by a first amount;
      for each feature vector of the plurality of feature vectors for moveable objects in the image frame:
         determining a second amount based on a similarity between the feature vector and the first feature vector, and
         increasing the value of the indicator by the second amount; and
      on condition that the value of the indicator indicates that the first feature vector is alive upon completing the iterative updating, determining that there is a moveable object that is located in the captured scene at least the predetermined portion of the given period of time.

2. The computer implemented method claim 1, wherein the feature vectors are received from a machine learning module trained to minimize distances between feature vectors extracted for the same moveable object in different image frames, and
   wherein the second amount is determined based on a distance between the further feature vector and the first feature vector.

3. The computer implemented method of claim 2, wherein the second amount increases as the distance between the feature vector and the first feature vector decreases.

4. The computer implemented method of claim 2, wherein the second amount is determined to be a fixed non-zero amount if the distance between the feature vector and the first feature vector is smaller than a threshold distance, and is determined to be zero if the distance between the feature vector and the first feature vector is equal to or larger than the threshold distance.

5. The computer implemented method of claim 1, wherein the feature vectors are received from a machine learning module trained to extract feature vectors for the same moveable object in different image frames having shorter mutual distances than distances to feature vectors extracted for other moveable objects, and
  wherein the value of the indicator is updated based on a distance between the feature vector and the first feature vector, or on a distance between the feature vector and a cluster of feature vectors, respectively.

6. The computer implemented method of claim 1, wherein the machine learning module comprises a neural network.

7. A non-transitory computer-readable storage medium having stored thereon instructions for implementing the method according to claim 1 when executed by a device having a processor and a receiver.

8. A device for determining whether there is a moveable object that is located in a captured scene at least a predetermined portion of a given period of time, the device comprising circuitry configured to execute:
  a receiving function, configured to receive a plurality of feature vectors for moveable objects in a first sequence of image frames captured during the given period of time, wherein the plurality of feature vectors is received from a machine learning module trained to extract similar feature vectors for the same moveable object in different image frames;
  an assigning function configured to assign an indicator having an initial value to a first feature vector extracted for a moveable object in a first image frame of the first sequence of image frames,
  wherein the initial value is greater than a first threshold value,
  wherein a value of the indicator greater than the first threshold value indicates that the first feature vector is alive, and
  wherein a value of the indicator equal to or less than the first threshold value indicates that the first feature vector is not alive;
  an updating function configured to, for each image frame subsequent to the first image frame in the first sequence of image frames and captured within the given period of time from the first image frame, performing an iterative updating of the indicator by:
    reducing the value of the indicator by a first amount;
    for each feature vector of the plurality of feature vectors for moveable objects in the image frame:
      determining a second amount, and
      increasing the value of the indicator by the second amount; and
  a determining function configured to, on condition that the value of the indicator indicates that the first feature vector is alive upon completing the iterative updating, determine that there is a moveable object that is located in the captured scene at least the predetermined portion of the given period of time.

9. A computer implemented method for determining whether there is a moveable object that is located in a captured scene at least a predetermined portion of a given period of time, the method comprising:
  receiving a plurality of feature vectors for moveable objects in a first sequence of image frames captured during the given period of time, wherein the plurality of feature vectors is received from a machine learning module trained to extract similar feature vectors for the same moveable object in different image frames;
  assigning an indicator having an initial value to a cluster of feature vectors identified among feature vectors extracted for moveable objects in a second sequence of image frames captured before the given period of time preceding the first image frame,
  wherein the initial value is greater than a second threshold value,
  wherein a value of the indicator is a number of feature vectors determined to belong to the cluster of feature vectors,
  wherein a value of the indicator greater than the second threshold value indicates that the cluster of feature vectors is alive, and
  wherein a value of the indicator equal to or less than the second threshold value indicates that the cluster of feature vectors is not alive;
  for each image frame subsequent to a first image frame in the first sequence of image frames and captured within the given period of time from the first image frame, performing an iterative updating of the indicator by:
    reducing the value of the indicator by a third amount;
    for each feature vector of the plurality of feature vectors for moveable objects in the image frame:
      determining whether the feature vector belongs to the cluster of feature vectors based on a similarity between the feature vector and the cluster of feature vectors, and
      if the feature vector belongs to the cluster of feature vectors, increasing the value of the indicator by a fourth amount; and
  on condition that the value of the indicator indicates that the cluster of feature vectors is alive upon completing the iterative updating, determining that there is a moveable object that is located in the captured scene at least the predetermined portion of the given period of time.

10. A non-transitory computer-readable storage medium having stored thereon instructions for implementing the method according to claim 9 when executed by a device having a processor and a receiver.

11. The method of claim 9, wherein the feature vectors are received from a machine learning module trained to extract feature vectors maximizing a probability for the same moveable object in different image frames to be located in a same cluster according to a cluster algorithm, and wherein the feature vector is determined to belong to a cluster of feature vectors according to the cluster algorithm.

12. A device for determining whether there is a moveable object that is located in a captured scene at least a predetermined portion of a given period of time, the device comprising circuitry configured to execute:
  a receiving function, configured to receive a plurality of feature vectors for moveable objects in a first sequence of image frames captured during the given period of time, wherein the plurality of feature vectors is received from a machine learning module trained to extract similar feature vectors for the same moveable object in different image frames;
  an assigning function configured to assign an indicator having an initial value to a cluster of feature vectors identified among feature vectors extracted for moveable objects in a second sequence of image frames captured before the given period of time preceding the first image frame,
  wherein the initial value is greater than a second threshold,
  wherein a value of the indicator is a number of feature vectors determined to belong to the cluster of feature vectors,
  wherein a value of the indicator greater than the second threshold value indicates that the cluster of feature vectors is alive, and wherein a value of the indicator equal to or less than the second threshold value indicates that the cluster of feature vectors is not alive;

an updating function configured to, for each image frame subsequent to a first image frame in the first sequence of image frames and captured within the given period of time from the first image frame, perform an iterative update of the indicator by:

reducing the value of the indicator by a third amount;

for each feature vector of the plurality of feature vectors for moveable objects in the image frame:

determining whether the feature vector belongs to the cluster of feature vectors based on a similarity between the feature vector and the cluster of feature vectors, and if the feature vector belongs to the cluster of feature vectors, increasing the value of the indicator by a fourth amount; and a determining function configured to, on condition that the value of the indicator indicates that the cluster of feature vectors is alive upon completing the iterative update, determine that there is a moveable object that is located in the captured scene at least the predetermined portion of the given period of time.

* * * * *